No. 744,823. PATENTED NOV. 24, 1903.
G. R. TUCKER & G. W. GODDARD.
CONCENTRATING APPARATUS.
APPLICATION FILED MAY 27, 1901. RENEWED OCT. 20, 1903.
NO MODEL.
6 SHEETS—SHEET 3.

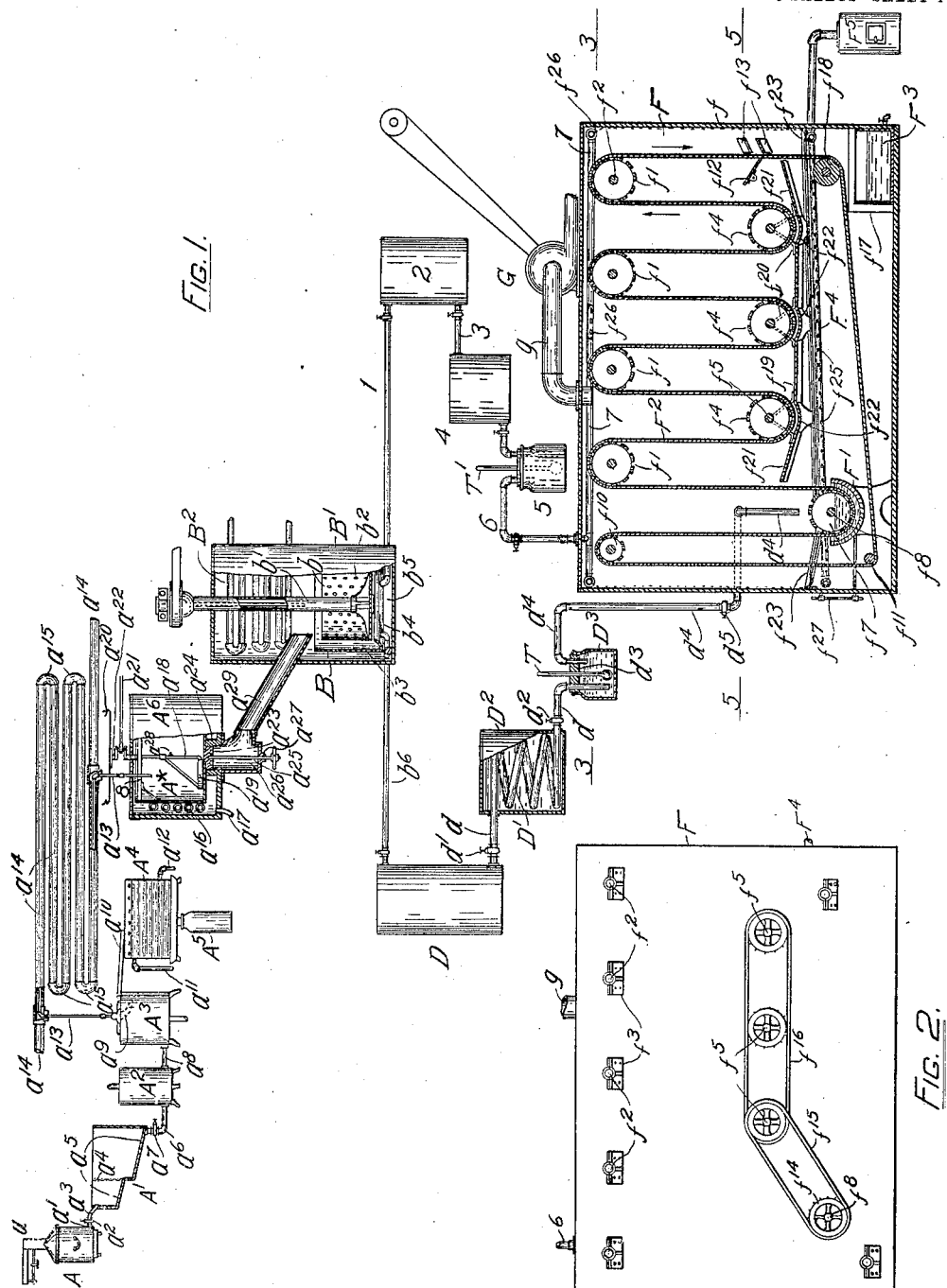

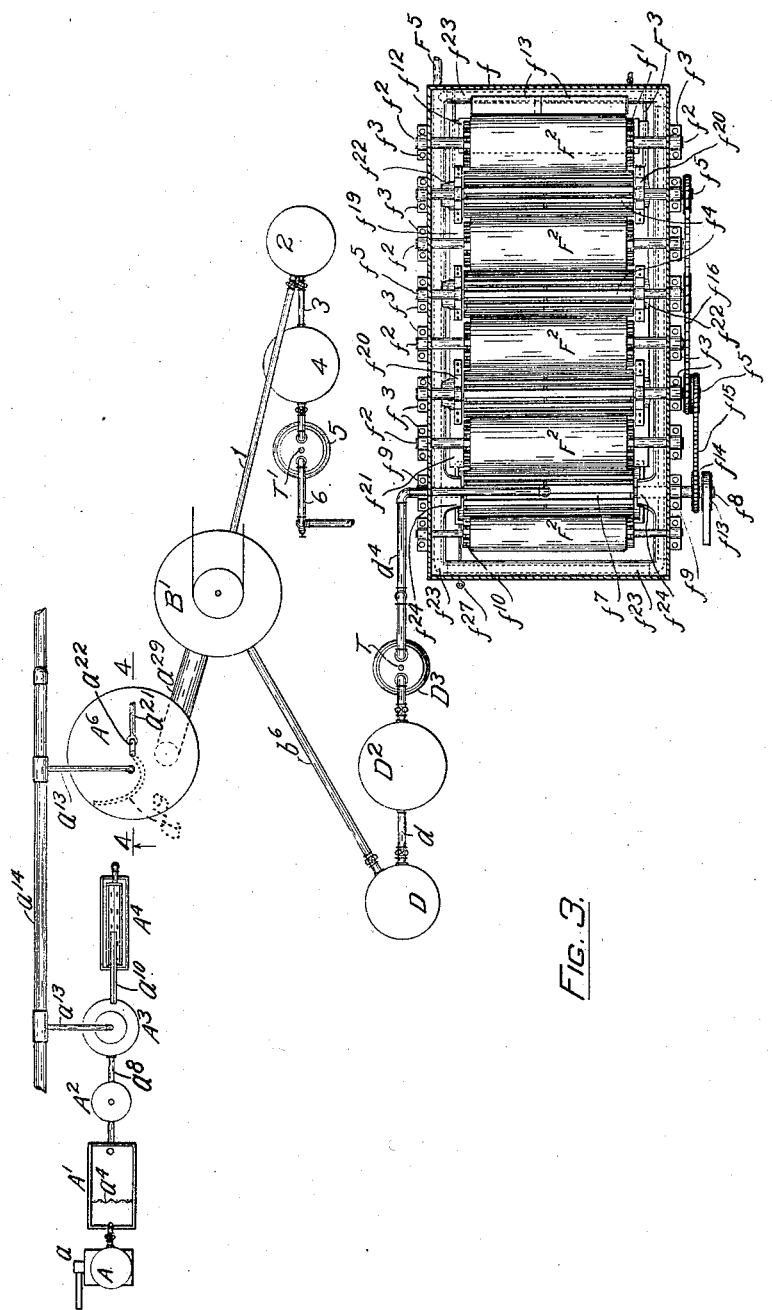

WITNESSES
E. A. Allen
M. C. Coveney

INVENTORS
Greenleaf R. Tucker
and
George Willis Goddard,
by their attorney,
Edward S. Beach No. 744,823. PATENTED NOV. 24, 1903.
G. R. TUCKER & G. W. GODDARD.
CONCENTRATING APPARATUS.
APPLICATION FILED MAY 27, 1901. RENEWED OCT. 20, 1903.
NO MODEL. 6 SHEETS—SHEET 6.

WITNESSES
E. A. Allen
M. F. Coveney

INVENTORS
Greenleaf R. Tucker
George Willis Goddard
by their attorney,
Edward S. Beach No. 744,823. Patented November 24, 1903.

UNITED STATES PATENT OFFICE.

GREENLEAF R. TUCKER, OF BOSTON, MASSACHUSETTS, AND GEORGE WILLIS GODDARD, OF CONCORD, NEW HAMPSHIRE, ASSIGNORS OF ONE-THIRD TO EDWARD S. BEACH, OF BOSTON, MASSACHUSETTS.

CONCENTRATING APPARATUS.

SPECIFICATION forming part of Letters Patent No. 744,823, dated November 24, 1903.

Application filed May 27, 1901. Renewed October 20, 1903. Serial No. 177,813. (No model.)

*To all whom it may concern:*

Be it known that we, GREENLEAF R. TUCKER, residing at Boston, in the county of Suffolk and State of Massachusetts, and GEORGE WILLIS GODDARD, residing at Concord, in the county of Merrimack and State of New Hampshire, citizens of the United States, have invented certain new and useful Improvements in Concentrating Apparatus, of which the following is a specification, reference being had therein to the accompanying drawings.

Figure 4:
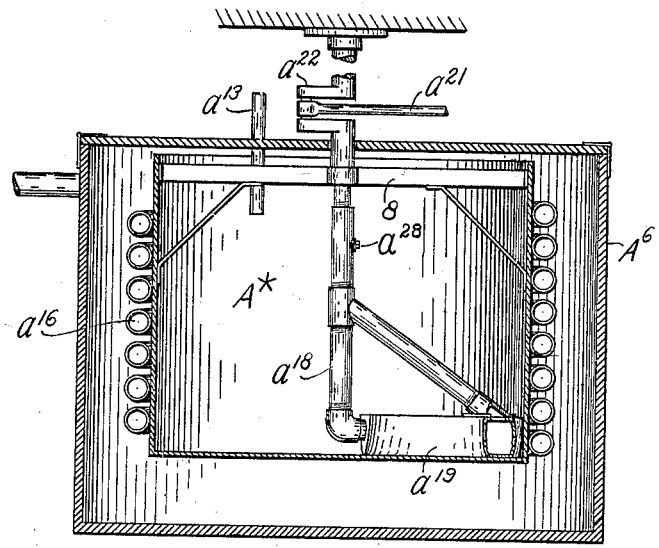
Figure 5:
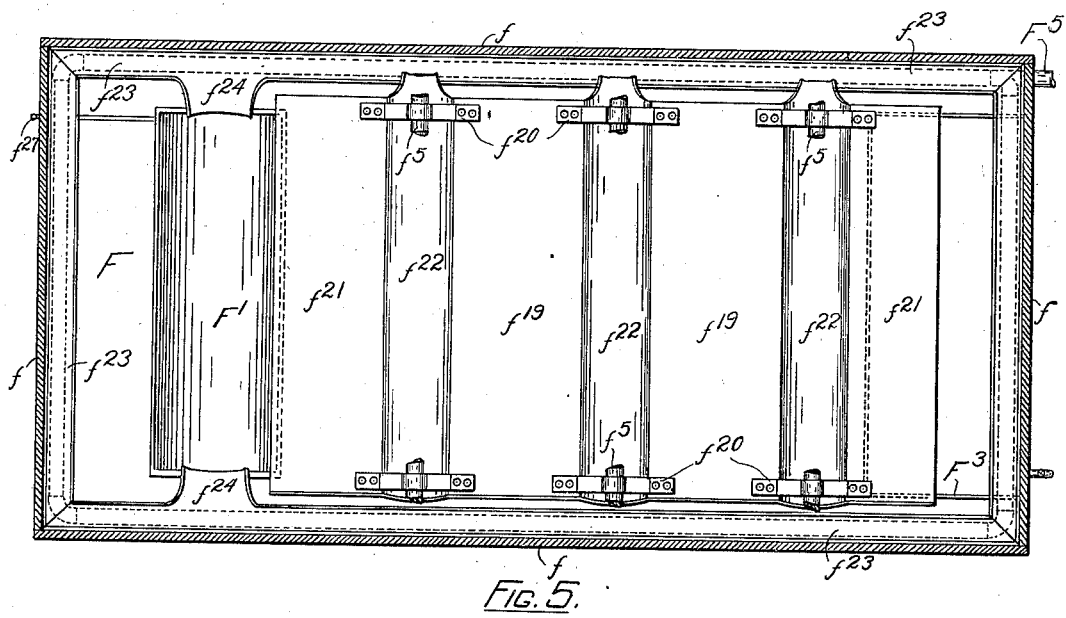
Figure 6:
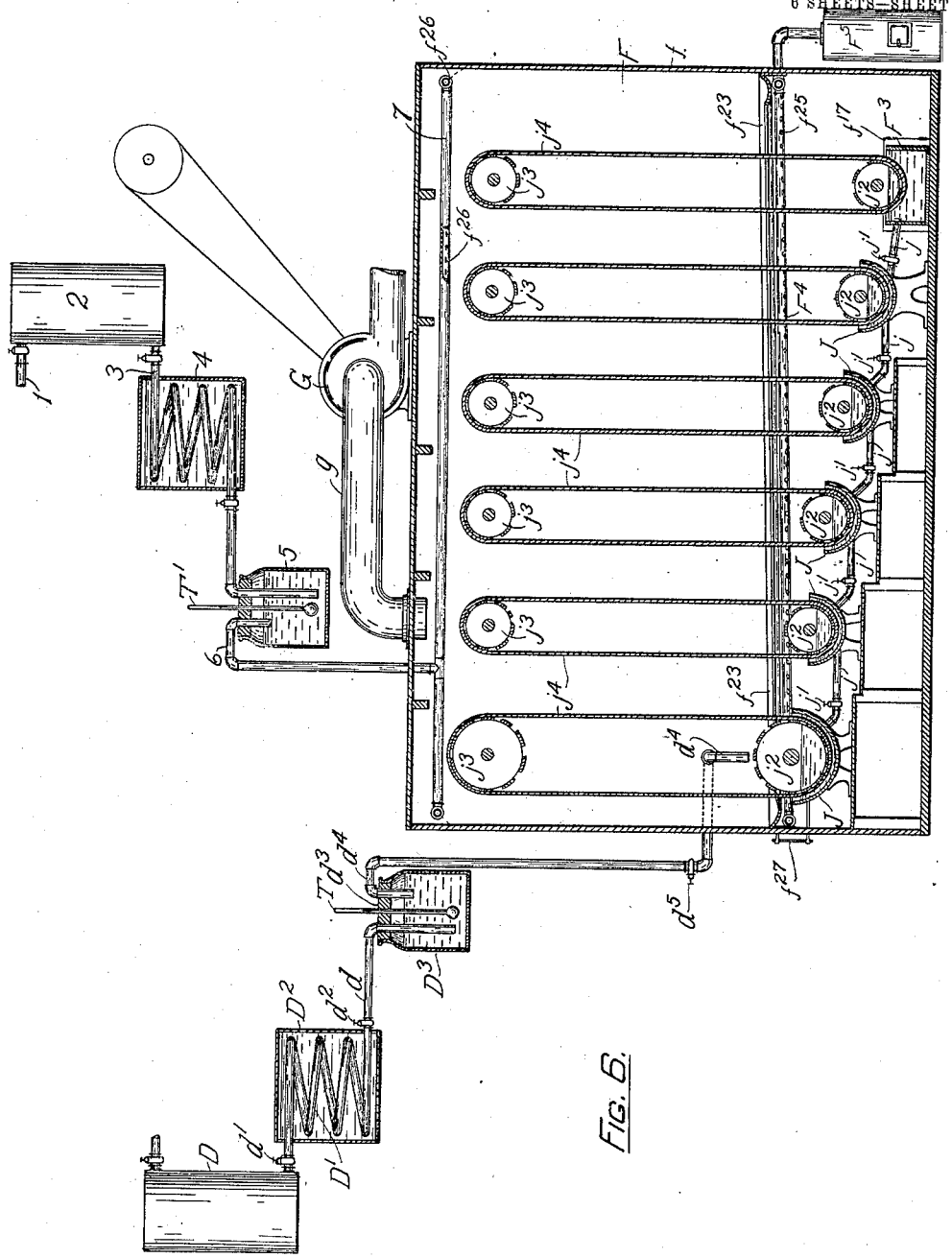
Figure 7:
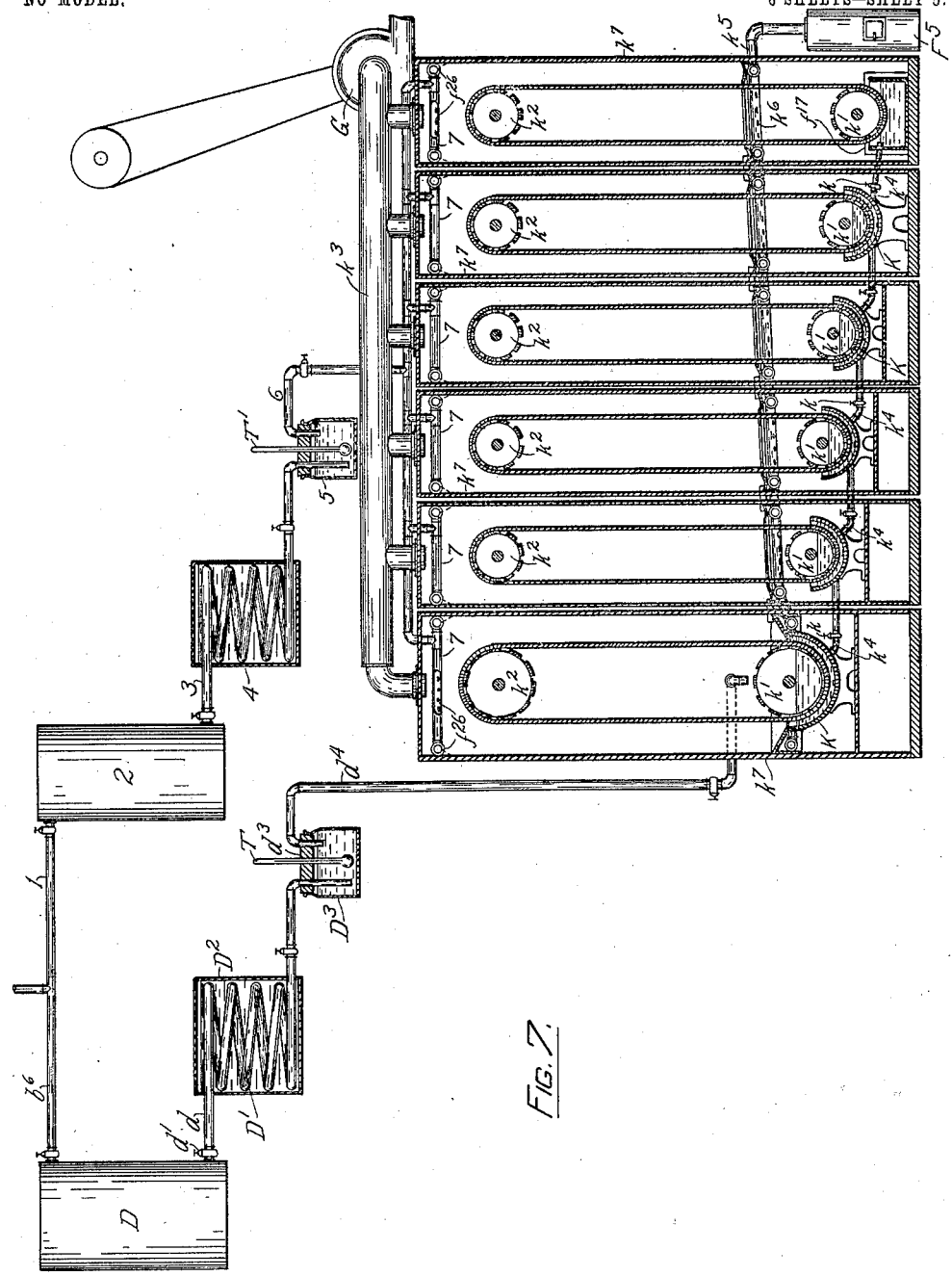
Figure 8:
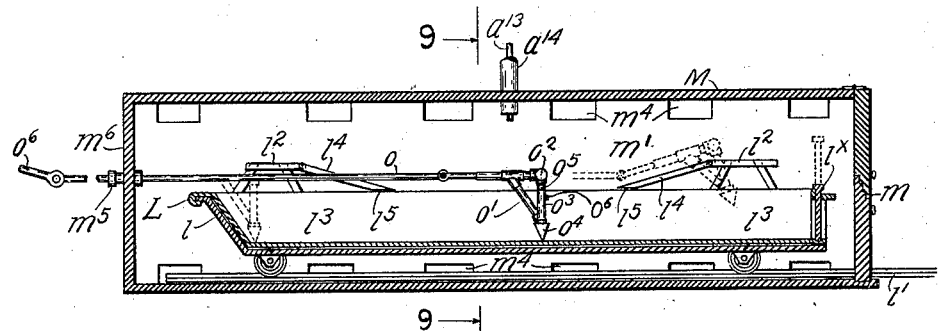
Figure 9:
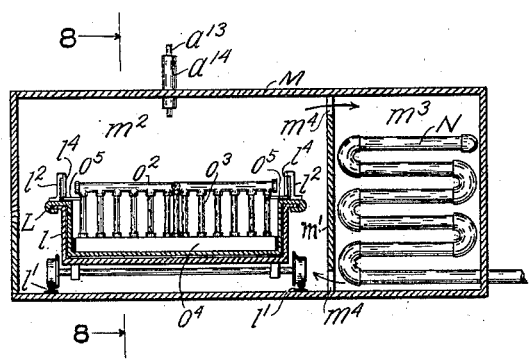

Figure 1 is a view, partly in side elevation and partly in vertical central section, of one form of our apparatus embodying our invention, some of the piping being broken away for greater clearness. Fig. 2 is a side elevation of one form of our new concentrator or evaporator which forms part of the complete apparatus shown in Fig. 1. Fig. 3 is a top plan view of what is shown in Fig. 1 except that the concentrator is shown in section on or at a line at 3 3 of Fig. 2, all the concentrator above the belts being removed for greater clearness. Fig. 4 is a vertical sectional view of the refrigerating-pan at line 4 4 of Fig. 3 looking in the direction of the arrow seen at said section-line. Fig. 5 is a sectional plan view at line 5 5 of Fig. 1 looking down and shows details of the concentrator with rolls, belts, and scrapers removed and shafts broken away for greater clearness. Fig. 6 is a sectional elevation of another modified form of concentrator, some auxiliary parts being in full lines. In this form of concentrator a plurality of belts are used, all the belts being in a common casing. Fig. 7 is a sectional elevation of a modified form of concentrator, some auxiliary parts being shown in full lines. In this form of concentrator a plurality of belts are used, each belt being in a compartment by itself. Fig. 8 is a lengthwise sectional elevation of a modified form of refrigerating-pan combined with a refrigerating-agitator instead of with a rotary agitator, as in the preferred form. Said view is on a line at 8 8 of Fig. 9 looking in the direction of the arrows seen at said sectional line. Fig. 9 is a transverse sectional elevation of what is shown in Fig. 8 and is taken on a line at 9 9 of Fig. 8 looking in the direction of the arrows seen at section-line.

The object of our invention is to produce an organized apparatus for the manufacture of concentrates of milk and also of other substances—such, for example, as meats, fish, fruits, vegetables, cereals, saps, &c.

We herein describe the apparatus in connection with the concentration of skim-milk, which is a convenient type of substance concentratable by said process and by apparatus embodying this present invention.

Condensed milk, both sweetened and unsweetened, is manufactured, sold, and consumed to an enormous extent in most civilized countries of the world as a substitute for natural cow's milk. The popularity and consumption of condensed milk are due to its enhanced keeping quality, its condensed form, and to the fact that it can be easily, economically, and safely transported and drawn upon as desired when milk is needed away from the source of milk-supply. Its disadvantages are general inferiority to natural milk, due to deleterious or objectionable changes that it undergoes during manufacture, these changes mainly resulting from cooking and from overlong time consumed in the process of condensation. The color, odor, and taste of condensed milk are not the same as those of natural milk, and in the case of sweetened condensed milk the presence of an abnormal amount of sugar greatly restricts its range of usefulness. The method of making condensed milk is essentially the same in all countries. It consists in evaporating milk to a thick consistency in a vacuum-pan under diminished pressure, whereby the water is evaporated at a much lower temperature than it could be in an open pan under normal pressure. Nevertheless the milk is injured in this process, owing to imperfect agitation, which permits particles of the milk to be overheated by contact with the hot walls of the evaporating-pan and also owing to the undue length of time required to complete the operation. Short time is a most important factor in a proper process of producing condensed or concentrated milk, as well as in producing many other food or beverage forming concentrates, condensations, extracts, and the like, not only in order to minimize the period of bacterial development or fermentation, but also in order to economize the labor and power required to produce the desired product.

The production of milk and other beverage and food forming concentrates involves the removal of most of the water by a procedure that does not injure physically or chemically the solid constituents of the milk, and by our apparatus there may be obtained a heat-evaporated uncooked concentrate of milk or other food-forming material, the concentrate being largely sterilized by the heat applied in the step of evaporation. The concentrate may be preserved by combination with suitable preservatives, such as sugar in the case of milk. When heat is employed to produce the evaporation, as it is in our apparatus, the principal factors that influence the quality of the product are the degree of heat employed and the length of time it is applied.

When liquid is subjected to evaporation in an open pan, the rate of evaporation depends on the extent of liquid-surface exposed, on the temperature of the liquid, on the barometric pressure, and on the humidity of the surrounding air. The rate of evaporation is greater the greater the surface exposed and the higher the temperature of the liquid up to its boiling-point, where it is at its maximum and where it remains constant. When milk is evaporated, the rate of evaporation of the aqueous part thereof depends on the extent of surface exposed and on the temperature to which the milk is heated; but in the case of milk the heat which may be employed to effect evaporation is restricted to a temperature that will not injure the milk solids, and that temperature is determined to a considerable extent by the volume of milk to be evaporated—in other words, by the length of time the milk must be subjected to heat to attain its desired degree of concentration.

In our present apparatus the milk or other volatilizable substance to be evaporated is exposed in thin films or sheets to the action of an artificially-heated atmosphere operatively maintained in the form of a current by the means of a suitable blower or suction device operatively connected with the casing of the concentrator within which evaporation takes place. By thus exposing the volatilizable substance a maximum evaporating-surface is secured, resulting in a corresponding rapidity of evaporation.

By our apparatus the aqueous portion of the milk or other evaporable substance is not evaporated, as heretofore, directly into a normal atmosphere, but into the artificially-heated atmospheric or gaseous current to which the material in its sheet, spray, or comparable form is exposed, the current taking up water or other volatile matter and carrying it away from the presence of the solids or non-evaporable parts. In this apparatus a current of artificially-heated air takes up and carries off water of evaporable or other volatile matter and leaves the non-evaporable parts on the belt. In this apparatus heat is not applied, as heretofore, to the entire volume of the milk or other substance operated upon from the beginning of the operation to the end, but only to that portion of it that is on the belt.

It has already been stated that the temperature to which milk can be heated for the purpose of evaporation is limited to that temperature which will not injure it. That temperature appears to be from about 70° to 80° centigrade for small quantities for a short time and from 50° to 60° centigrade for larger quantities for a longer time. We therefore prefer to evaporate the milk at the latter temperature. That portion of the milk which is in sheet-like or sprayed condition is in practicing our process preferably maintained at from 50° to 60° centigrade during evaporation; but the maintenance of this temperature of the milk during evaporation is effected by the surrounding heated-air current, which for rapidity of evaporation should and may be from 90° to 100° centigrade. Milk subjected to the influence of from 90° to 100° centigrade in the ordinary manner of heating or evaporating liquids would be quickly cooked or ruined; but the milk in its sheet or spray form on the belt is in constant motion, and the heated air is also in motion, and rapid evaporation takes place by virtue of the great capacity of heated air for moisture. The moist air is removed as fast as formed, and a working temperature of from 50° to 60° centigrade of the milk in sheet-like or analogous form, notwithstanding the surrounding air-current is from 90° to 100° centigrade, is a resultant of the evaporation under the stated conditions and due to the cooling effect of the evaporation on the belt. The milk, therefore, is not overheated—that is to say, the seeming antagonism to milk of from 90° to 100° centigrade of heat is reconciled under our process, because of this high degree of heat, which under normal conditions impairs the milk, reduces the temperature of the milk or non-evaporable solids to from 50° to 60° centigrade, and the discovery of said Tucker, stated in said pending application, that "both the high temperature, required for rapid evaporation, and a lower temperature, which will not injure the solids, may be effectively and simultaneously employed in the production of alimental concentrates" is availed of in apparatus embodying our present invention.

Coincident with the evaporation of milk in our apparatus is the simultaneous sterilization that it undergoes, the word "sterilization" being here used in the technical sense of partial sterilization. A temperature of from 50° to 60° centigrade kills most bacteria. The spores are not killed by such temperature, and it is an important but still an open question whether spores subjected to this temperature can develop into full-grown organisms. If they can, then complete sterilization is possible by our method, because in that event the spores will be changed into full-grown organisms, and the full-grown organisms will be killed, wholly or in part, at the temperature of from 50° to 60° centigrade.

The fact that organisms are killed or at least their growth arrested at a temperature of from 50° to 60° centigrade is important aside from the question of partial sterilization, for any attempt to concentrate milk by this method at a temperature substantially lower than 50° centigrade results in failure, owing to the multiplication of organisms and consequent coagulation, souring, peptonization, and other results of bacterial development. In other words, a temperature of from 50° to 60° centigrade is a temperature at which bacteria cannot multiply, and even though the same temperature did not partially sterilize, which it does, milk could still be successfully concentrated by this apparatus.

It is a coincidence in the process carried out by our apparatus, and a fortunate one, that the temperature at which the milk can be evaporated without deleterious physical or chemical change is a temperature which prohibits the development of bacteria, which kills most of them, and at the same time is a temperature which permits a considerable rate of evaporation, which rate may be enormously increased by raising the temperature of the evaporating and water-removing current.

The criterion of the goodness of condensed milk is the exactness with which it when diluted with a definite amount of water corresponds to whole milk. The relation of butter fat and of solids not fat should bear the same relation to each other in condensed milk that they do in whole milk. The color, odor, and taste of the condensed milk should correspond with those of whole milk, and the condensed milk should be such that when properly diluted with water the product cannot be distinguished from whole milk and be from a chemical point of view up to the standard set for whole milk drawn directly from the cow. It is safe to say that no condensed milk in the market fulfils these conditions. The present condensed milks are deficient in solids for the degrees of dilution recommended. The relation therein of fat to solids not fat is not correct. They are especially deficient in fat, and their color, odor, and taste are more or less objectionable. Diluted with water they do not correspond to whole milk, either chemically or physically. Absolute exactness in a condensed milk is perhaps an impossibility; but it is much desired by producers and consumers.

From a chemical point of view the milk constituent which probably undergoes the most essential change when whole milk is concentrated is the fat. Decomposition products of fat in any considerable amount are offensive alterations of the constituents of milk. Changes in the casein, albuminoids, &c., are not particularly objectionable; but the sum total of effect when whole milk is concentrated by customary methods is a product changed chemically and physically from the normal to a greater extent than is desirable.

In using our apparatus for the concentration of milk we prefer to operate on milk from which the fat has been removed—i. e., on skimmed milk. To the final skim-milk concentrate produced there is preferably added the proper amount (usually a statutory requirement varying in the different States) of butter fat in the form of cream, by which procedure there is obtained a finished condensed milk more nearly approaching the statutory standard than by the concentration of whole milk itself; but whole milk may be treated in our apparatus, if desired. The heated current used to induce the evaporation and to arrest bacterial development may be any suitable moisture-absorbing gas—such as atmospheric air or carbonic-acid gas, for example. By apparatus embodying our invention we are able to concentrate whole or skim-milk, fruit-juices, infusions of malt, beef, &c., the concentrates being characterized by natural taste and flavor.

Inasmuch as shortness of time is a very important factor in the production of alimental concentrates in accordance with either said method or with this present invention, we sometimes prefer in the case of milk, especially in some climates and under some conditions, to have the concentration supplied with what may be called a "partial" concentrate obtained from so-called "cold-process" refrigerating and centrifugalizing apparatus; but we have successfully concentrated both whole and skim milk by beginning its treatment in the concentration itself without first passing the milk through so much of the herein-described apparatus as is prior in its operation to the operation of the concentration itself.

In the drawings illustrating the principle of our invention and the best mode now known to us of applying that principle, A is a weighing-can, and $a$ the scales therefor. Can A discharges through its outlet $a'$, which is controlled by a valve $a^2$, into a trough $a^3$, which discharges into a receptacle A', preferably provided between its ends with a screen $a^4$. The bottom $a^5$ of the receptacle is inclined from below the trough $a^3$ to its outlet end, where the outlet-pipe $a^6$ leads, in this instance, to a tempering-box $A^2$, the outlet-pipe $a^6$ of receptacle A' being provided with a valve $a^7$. In lieu of the tempering-box $A^2$ a pasteurizer may be used, if so desired. From the tempering-box $A^2$ an outlet-pipe $a^8$ leads to a separator $A^3$, provided with the usual cream-ejector $a^9$, the cream being thereby thrown into trough $a^{10}$, which discharges on the corrugated cream-cooler $A^4$, whence the cream is discharged into the cream-can $A^5$. The corrugated cream-cooler $A^4$ is provided with the usual water-escape conduit $a^{11}$ and the water-inlet conduit $a^{12}$.

All the foregoing parts in the arrangement described are old and well known, and too well known by all skilled in the dairy art to require detailed description.

The skimmed milk is thrown upwardly from the separator $A^3$ through the skimmed-milk conduit $a^{13}$ in the old and well-known way. In practice, as is well known, the skimmed milk may be ejected upwardly from the separator for a distance of eight or ten feet. In carrying out our invention in the mode hereinafter illustrated the skimmed-milk conduit $a^{13}$ is carried back and forth through the pipes $a^{14}$, which are connected by return-bends $a^{15}$ $a^{15}$, the skimmed-milk conduit $a^{13}$ having an exterior diameter which is less than the interior diameter of the pipes $a^{14}$ $a^{14}$, through which latter pipes a suitable refrigerating-gas or other suitable refrigerating medium is circulated, so as to cool, but not congeal, the skimmed milk while it is traveling to the refrigerating-pan $A^*$. Skimmed-milk conduit $a^{13}$ opens above the pan, so as to discharge therein. The cooling apparatus, composed in this instance of the pipes $a^{14}$ and return-bends $a^{15}$, may be connected in any suitable manner with any suitable supply source of refrigerating medium. The refrigerating-pan $A^*$ is mounted within a box $A^6$ and is preferably surrounded with a coil $a^{16}$ within box $A^6$, the coil conveying a suitable refrigerating medium from any suitable source of supply, so as to congeal the skim-milk in pan $A^*$. An outlet-pipe $a^{17}$ is provided for box $A^6$, so as to lead off any moisture that may accumulate therein.

It is of practical importance that the refrigerating-coil $a^{16}$ should not pass over the skim-milk in the refrigerating-pan $A^*$, because if such were the case then the moisture evaporating from the skimmed milk in the pan would congeal on the pipes in the form of frost or snow, and the same would frequently drop off into the milk in the pan and contaminate and dilute the skimmed milk therein. Consequently we prefer not to expose the milk to refrigeration at its exposed surface. Simultaneously with the congelation of the skim-milk in pan $A^*$ it is agitated so as to break it up into small portions or flakes, and in order to agitate the skim during congelation and so prevent it from freezing solid, an agitator-shaft $a^{18}$ is carried through the box $A^6$ and pan $A^*$ and provided with a rotary agitator $a^{19}$ within pan $A^*$.

The upper end of agitator-shaft $a^{18}$ is journaled in a fixed bearing $a^{20}$, and the shaft is driven in this form of our invention by the crank-rod $a^{21}$, connected with a crank $a^{22}$ on the agitator-shaft. Shaft $a^{18}$ has another bearing in a transverse strut 8 at the upper part of pan $A^*$, through which strut the shaft passes upwardly out of pan $A^*$.

The bottom of pan $A^*$ is provided with an outlet-port which is closed by a suitable cover or stopper, shown here in the form of a threaded plug $a^{23}$. Plug $a^{23}$ screws into an internally-threaded sleeve $a^{24}$, fixed on the inner surface of pan $A^*$, which it surrounds. Plug $a^{23}$ is fast on the threaded rod $a^{25}$, which passes from the plug downwardly through the bottom of chamber $a^{26}$, where it has a bearing in the internally-threaded boss $a^{27}$, so that the shaft $a^{25}$ is centered. By turning shaft $a^{25}$ in one direction or the other the plug $a^{23}$ is moved to open or close pan $A^*$. To remove any milk that may have congealed on that part of shaft $a^{18}$ which is within pan $A^*$, as well as on the agitator $a^{19}$, the shaft $a^{18}$ and the members of the agitator are preferably made hollow, so that steam may be admitted to warm up the shaft and agitator, and thereby remove any congealed milk thereon. The steam may be admitted by connecting at $a^{28}$ any suitable supply-pipe coming from a source of steam-supply. Chamber $a^{26}$ communicates with the discharge-conduit $a^{29}$, so that when the plug $a^{23}$ is open the congealed but broken-up milk will flow from the refrigerating-pan $A^*$ into the basket centrifugal machine B. The centrifugal machine B (shown in the drawings) is provided with the usual basket $b$ on the vertical shaft $b'$ and rotates therewith. In the operation of the present apparatus the congealed milk is discharged into the basket $b$, and as the basket rotates the partially-concentrated milk is thrown outwardly by centrifugal force through the perforations $b^2$ of the basket into the chamber $b^3$, whence it flows through the central aperture $b^4$ into the chamber $b^5$, which is provided with any desired number of outlet-conduits $b^6$, in this case two in number. In the present instance we inclose the centrifugal machine B in a surrounding casing $B'$ and place within the casing $B'$ a refrigerating-coil $B^2$, of any desired form, the purpose of the refrigerating-coil within the casing $B'$ being to maintain the congealed milk at or slightly below the freezing-point. It is important that the temperature of the congealed mass in the centrifugal machine should not at any time during the operation thereof rise above the freezing-point, for in that event the congealed mass will begin to melt, and any melting will result in a dilution of the product, which escapes through the outlet conduit or conduits $b^6$, and such dilution would materially interfere with the rapidity with which concentration would be effected and with the economical operation of the machine. Outlet-pipe $b^6$ for the discharge of the partially-concentrated milk from the centrifugal machine leads downwardly into a receiving-tank D, from the lower end of which a discharge-conduit $d$ is formed into a coil $D'$ within the casing $D^2$. The conduit $d$ is provided with a valve $d'$ between tank D and casing $D^2$, the conduit $d$ thence leading, preferably, into an observation-receptacle $D^3$, wherein it discharges. A valve $d^2$ is provided between the casing $D^2$ and receptacle $D^3$. This receptacle $D^3$ may be made of glass, if desired, or of other material and provided with a window for convenient observation of the temperature and the material in the receptacle $D^3$ as it flows therethrough. A thermometer T is preferably introduced into the receptacle, with its stem extending upward through the stopper or cover $d^3$ thereof. The material in receptacle $D^3$ flows therefrom through the outlet-conduit $d^4$, which leads into the final concentrator F. Conduit $d^4$ is provided with a valve $d^5$ between receptacle $D^3$ and the evaporator F.

Centrifugal machine B is connected, by means of an auxiliary conduit 1, with a closed tank 2, from which a conduit 3 leads into a casing 4, wherein it is coiled, (in the same manner as conduit $d$ is coiled at $D'$ in casing $D^2$,) and leads thence to an auxiliary closed observation-receptacle 5, wherein is a second thermometer T'. From receptacle 5 a conduit 6 leads into a flushing-pipe 7 within the casing of the concentrator F, for a purpose described later on.

The object of our invention in respect of the concentrator is to provide a maximum rate of evaporation without subjecting the milk to a temperature which will alter or impair its natural quality or flavor, and we hereinafter point out an important discovery in this connection.

Referring to the construction of the preferred form of our new concentrator, $f$ is a closed casing within which, near the upper part thereof, a plurality (preferably) of rollers $f'$ are mounted with their journals $f^2$ in suitable journal-boxes $f^3$, secured to the opposite outside walls of the casing. At the bottom portion of said casing there is another series of rollers $f^4$, which are respectively staggered with respect to the upper rollers $f'$, the journals $f^5$ of the lower rollers being mounted in suitable journal-boxes $f^6$, fast to the opposite outsides of the casing. Near that end of casing $f$ into which the conduit $d^4$ leads and toward the bottom of the casing there is a transverse trough or receptacle F' for holding the milk (or other material) to be concentrated. Receptacle F' is in parallelism with the rollers $f'$ and $f^4$. The inlet-conduit $d^4$ discharges over this trough F', and roller $f^7$ is mounted within the trough with its journals $f^8$ mounted in bearings $f^9$ on the opposite outsides of the casing. A transverse roller $f^{10}$ is journaled at the upper part of casing $f$ near the receiving end of the concentrator, and a transverse roller $f^{11}$ is similarly journaled at the lower portion of the concentrator, near the receiving end thereof. Toward the discharge end of the concentrator a doctor $f^{12}$ is mounted on casing $f$ in contact with the inner side of an endless belt, and other doctors $f^{13}$ are similarly mounted to engage the other side of the belt. All the rollers mentioned support and guide an endless belt $F^2$, which is caused to travel over the rollers by power applied in any suitable manner to one or more of the journals of the rollers. In this instance power is applied to a journal $f^8$ of the roller $f^7$, which rotates within receptacle F', the journals being extended beyond the outside of the casing $f$ and provided with a driving-pulley $f^{13}$. This journal is also provided with a sprocket-wheel $f^{14}$, whence a chain $f^{15}$ extends to a sprocket-wheel on the next roller-journal $f^5$, which, with the other roller-journals $f^5$ on the same side of the casing, is provided with sprocket-wheels, all connected and drawn by a sprocket-chain $f^{16}$. This is one of many well-known mechanical arrangements by which belt $F^2$ is continuously driven to lift by adhesion the substance in the trough and carry it up and down over those rollers which are between the trough and the discharge end of the concentrator, the substance on the belt being removed to a great extent at the discharge end of the concentrator by any suitable means—such as the described doctors, for example—into a receiving-receptacle $F^3$, which preferably is of a length equal to the width of the concentrator and removable therefrom through a doorway $f^{17}$. After passing the doctors the belt is led under a roller $f^{18}$ and thence under roller $f^{11}$, whence it goes over the roller $f^{10}$ and down to the trough F'. To prevent droppings from the belt or rollers falling on the belt as it runs, as indicated by arrow, from roller $f^7$ to roller $f^{18}$, we provide a shield $f^{19}$, which is a little wider than the belt and which is conveniently hung on the journals of the rollers $f^4$, such journals passing loosely through the holes in the boss $f^{20}$, which extend upwardly at opposite sides of the shield. The opposite end portions of shield $f^{19}$ incline upward and outward at $f^{21}$, so that droppings from the upper rollers $f'$ or from the belt will run downwardly and be caught in the transverse troughed portions $f^{22}$ of the shield, the side margins of which project over the gutter $f^{23}$, that extends clear around the inner side of casing $f$ and is inclined so as to discharge into trough F', as at $f^{24}$ $f^{24}$. Concentrator F is provided at its bottom portion with a gas-inlet pipe $F^4$, which extends around the casing and provided with a number of perforations $f^{25}$ for the introduction of heated atmospheric air or other gas within the casing $f$ during the concentrating operation. During the concentrating operation the hot air introduced therein is maintained in current form by any suitable device, such as suction-blower G, the construction of which is too well known to require description. The inlet-conduit $g$ of the suction-blower is led into the casing $f$, preferably at the upper side thereof, and the hot air is drawn through the concentrator F by the operation of the suction-blower, so that the endless belt travels in a continuous current of hot atmospheric air or other suitable gas, and the milk (or other material) supplied to trough F' is continuously removed from the trough into the chamber of the casing in sheet or film-like form on the surfaces of the belt.

In order to prevent solidification and charring of the milk which may spatter on the side walls of the casing $f$, the auxiliary parts 1, 2, 3, 4, 5, and 6, above referred to, are provided, the auxiliary supply-conduit 6 leading through the top of casing $f$ into the horizontal flushing-pipe 7, which extends around the casing $f$, inside thereof, and is provided with a number of perforations $f^{26}$, through which the milk (or other material) so introduced into the conduit or pipe 7 flows out and trickles down the vertical side walls of the casing, forming practically a continuous sheet or film of milk on the inner surfaces of the side walls, where, like the films or sheets of milk (or other material) on the belt, it is exposed to the evaporating action of the hot gaseous current traveling through the casing. The gutter $f^{23}$ catches the downflow, which thereby flushes the inner side of the casing, the downflow, of course, being of the same material as that being treated and escaping from gutter $f^{23}$ by the escapes $f^{24}$ into the trough F', where it commingles with the contents thereof and is again subjected to the action of the belt and gaseous current. This constant return of the downflowing flushing material (milk or other liquid) into the main portion of the material being concentrated greatly increases the rapidity of the concentration of the whole mass, because such downflowing flushing material is itself more or less concentrated in consequence of the evaporation to which it is subjected while flowing down the inner sides of the casing.

The various parts herein described through which the milk or other liquid passes into the centrifugal B, together with the centrifugal, constitute one kind of a supply source for the evaporator or concentrating apparatus described, and a novel feature of our concentrator or evaporator lies in the connection thereof with the source of supply by means of the intermediate and independent supply devices $b^6$, D, $d$, D', $D^3$, T, and $d^4$ in one supply device and 1, 2, 3, 4, 5, T', and 6 in the other supply device. We prefer to use both sets of supply devices, the construction and operation of the members of which are elsewhere fully described.

A gage $f^{27}$ is conveniently mounted on the outside of casing $f$, with its stem leading into trough F' in order that the supply to the trough may be shut off before too much material accumulates therein.

The heated gas-inlet pipe $F^4$ draws its heated supply from any source, such as through the heater $F^5$.

In the drawings we have shown many valves to which no particular reference has been made, although some of them have been described. The number and arrangement of the valves in the different parts of the apparatus will in practice depend largely on the preference of the constructor or user.

It will be obvious to all mechanics that different factors of the apparatus may be differently constructed and arranged and that the dimensions of the various parts may be greatly varied, according to the nature of the material to be concentrated, as well as to the quantity which it is desired to concentrate. It is our intention, however, that, as a general rule, the apparatus shall be constructed on a large scale, so that in the case of milk, for example, all the milk brought to a dairy may be speedily reduced to the form of a thick concentrate, which is more economical for storage or transportation than milk in its ordinary legal form.

When all the valves of the system are open and the agitator, centrifugal machine, and concentrator are all in operation, the work will continue, although it may be desirable now and then to stop the supply to the trough or receptacle F' in the concentrator. We desire it to be distinctly understood that, if desired, the material to be concentrated may be put directly into the trough F' without any prior treatment, for the process of concentration is so rapidly and efficiently performed by the concentrator alone that for many uses and under many conditions no auxiliary apparatus is necessary. In making this statement we of course include as a part of the concentrator the means for supplying the chamber thereof with a current of hot gas. Any desired material may be used for the belt $F^2$, and while we have found ordinary canvas to be efficacious we prefer to use a woven-wire belt, in the interstices of which the material to be concentrated is caught during the travel of the plate. The number of rollers $f'$ and $f^4$ which are used will depend very largely upon the desired capacity of the concentrator, and, generally speaking, we prefer to use a plurality—in fact, as many as practicable—of the upper rollers $f'$ and as many as possible of the lower rollers $f^4$ in order that the maximum belt-surface may be obtained for exposing the material in its adhering sheet or film like form to the hot current which rushes over and past it. The degree of heat employed must be varied for different materials, and it is to be remembered that the rate of evaporation and consequent cooling of the material on the belt or at the site of concentration is very largely increased by a slight rise in temperature of the hot-air current. It is to be understood that the different parts of our apparatus are to be provided with doors, manholes, and the like, so that the interior of the different parts may be reached and readily cleansed. In order to thoroughly cleanse the apparatus as a whole, we may connect its several parts A', $A^2$, $A^3$, $A^5$, $A^6$, B, B', D, $D^3$, 2, 5, and 7 with a live-steam pipe, so that through suitable connections of the several parts to the said live-steam pipe live steam may be admitted therein and pass through the various connecting-conduits for the sterilization and cleansing of the apparatus as a whole. The steam-pipe may be conveniently led from the boiler of the engine used for driving the apparatus. The steam-pipe for this purpose is not shown, because it will be readily understood by mechanics without particular description.

In Fig. 6, showing a modification of the concentrator, a series of independent receptacles or troughs J are mounted within the concentrator-casing and connected at their bottoms by a common inclined pipe $j$, provided with suitable valves $j'$. Within each trough a roller $j^2$ is mounted, and within the casing, near the top thereof, there is a series of rollers $j^3$, each of the upper rollers $j^3$ being directly over a roller $j^2$. Over each opposite roller $j^2$ and $j^3$ a belt $j^4$ passes, so that the concentrator-casing contains a plurality of belts. The troughs J are at different levels, so that the material concentrated in the first trough may flow into the second trough and be therein further concentrated, and so on to the last trough.

In Fig. 7 another form of concentrator is shown, which is made up of a series of independent glass casings each containing a trough K, a valve $k$, rotating roller $k'$, and an upper roller $k^2$, with a belt passing over both rollers. The several independent casings are each connected to a common suction blower-pipe $k^3$, the troughs in the several boxes are at different levels, and inclined pipe $k^4$ leads from the higher trough to the next lower trough, and so on from trough to trough, as in the modification described in the preceding figure. The hot-gas-inlet pipe $k^5$ is provided with perforations $k^6$, and each of the independent casings is imperforate between the casings, which are severally marked $k^7$.

In Figs. 8 and 9, showing a modification, we show a refrigerating-pan and agitator of a construction widely differing from that shown in our preferred form of apparatus; but the two forms have this in common, that the agitator for each pan operates so as to prevent the congelation of a thick mass at the sides of the agitator. It is very important to prevent the formation of the thick mass of the material operated upon in the refrigerating-pan and out of the field of operation of the agitator, because such a mass will frequently tend to sour or ferment and so spoil such of the contents of the pan as is being constantly agitated by the movement of the agitator during the time that the agitated mass is being simultaneously congealed and broken up into flake-like form. In this modification the refrigerating-pan L is provided with a gate $l^\times$ and is mounted on a car $l$, that may be moved along tracks $l'$, leading into the interior of the refrigerator M, through a passage which may be sealed by suitable means, such as a double door $m$. Parallel with the track is a partition $m'$, dividing the interior of the refrigerator into two chambers, one, $m^2$, for the refrigerating-pan, and the other, $m^3$, for a refrigerating-coil N, said chambers communicating with each other through openings $m^4$ at the top and bottom of said partition, and said refrigerating-coil N having proper connections with any desired source for supplying a refrigerant liquid. A skim-milk conduit $a^{13}$ opens above the refrigerating-pan L, so as to discharge therein when the car is within the refrigerator. The agitator is designed to move lengthwise the pan L, and consists of a reciprocating rod $o$ and rake $o'$, pivotally secured thereto, the rod entering the refrigerator through a suitable stuffing-box $m^5$ in the wall $m^6$ opposite the door $m$ and at a point above the top of the pan. The head $o^2$ of the rake $o'$ at right angles to the rod $o$ extends across the pan L and is provided with numerous tines $o^3$, fast in the base of a bar $o^4$, triangular in cross-section, the apex of the bar being in contact with the bottom of the pan, as shown in Fig. 8. At each end of the head of the rake and lying above the adjacent top edge of the pan is a round rod $o^5$. Near each end of the pan L a pair of brackets $l^2$ is secured to and above the sides $l^3$ of the pan L for the purpose of supporting inclined ways $l^4$, each way being pivotally secured to its respective bracket and having its free end resting on the top of the side $l^3$ of the pan, as at $l^5$. The rod $o$ is reciprocated by any suitable means—as, for example, by a crank and connecting-rod $o^6$. To remove any milk that has congealed on that part of the agitator within the pan, the agitator $o'$ is made hollow, so that steam may be admitted by connecting thereto, as at $o^7$, when desired, a suitable supply-pipe coming from a source of steam-supply. It will now be plain that in the movement of the agitator from one end of the pan to the other the round rods $o^5$ on the head $o^2$ of the rake will come into contact with a pair of inclined ways $l^4 l^4$, ride up the same, as shown in dotted lines in Fig. 8, and then the rake $o'$ of the agitator will drop of its own weight close to the end of the pan L and then be drawn along the bottom of the pan in an opposite direction under the free ends of said ways $l^4 l^4$ at $l^5 l^5$, come into contact with the other pair of inclined ways, $l^4 l^4$, ascend the same, then drop, pass under said ways, and repeat the first operation, the agitator thus preventing the collection of a thick mass of material operated upon from collecting at the ends and sides of the pan.

While our said invention is embodied in the form herein shown and described, it will be understood that we do not limit ourselves to any particular form of apparatus, it being obvious that many changes and modifications may suggest themselves to any one skilled in the art.

What we claim is—

1. In concentrating apparatus, the combination of a closed casing a gas-inlet port and a gas-outlet port with a receptacle, within the casing, for liquid material to be concentrated; a device for continuously removing from the receptacle into the chamber of the casing, sheet-like portions of said liquid material; means for creating and maintaining a current of gas through the casing; means for removing concentrated material from said removing device, means for flushing the side walls of the casing; and means for returning the flushing material into the receptacle.

2. In concentrating apparatus, the combination of a closed casing having a gas-inlet port and a gas-outlet port with a receptacle, within the casing, for liquid material to be concentrated; a device for continuously removing from the receptacle into the chamber of the casing, sheet-like portions of said liquid material; means for creating and maintaining a current of suitably-heated gas through the casing; means for removing concentrated material from said removing device and means for flushing the side walls of the casing.

3. In concentrating apparatus, the combination of a closed casing having a gas-inlet port and a gas-outlet port with a receptacle within the casing, for liquid material to be concentrated; means for continuously removing from the receptacle into the chamber of the casing sheet-like portions of said liquid material; means for creating and maintaining a current of gas through the casing; means for removing concentrated material from said removing device; and means for flushing side walls of the casing.

4. In concentrating apparatus, the combination of a closed casing having a gas-inlet port and a gas-outlet port with means for creating and maintaining a gas-current through the casing; a receptacle, within the casing, for material to be concentrated; a series of upper guide-rollers within the casing, near the upper portion thereof; a series of guide-rollers within the casing, near the lower part thereof; a roller within said receptacle; an endless belt mounted on and supported by said rollers; means for traveling said belt; means for removing concentrated material from said belt and means for flushing the side walls of the casing.

5. In concentrating apparatus, the combination of a source of supply of liquid material to be concentrated with a closed casing having a gas-inlet port and a gas-outlet port; a receptacle, within the casing, for liquid material to be concentrated; a device for continuously removing from the receptacle into the chamber of the casing, sheet-like portions of said liquid material; means for creating and maintaining a current of gas through the casing; means for removing concentrated material from said removing device; means for flushing the side walls of the casing; means for returning the flushing material into the receptacle; and, intermediate the casing and said source of supply, two sets of supply devices, each substantially as described, and one discharging into said receptacle and the other feeding into the flushing means.

In testimony whereof we affix our signatures in presence of two witnesses.

GREENLEAF R. TUCKER.
GEORGE WILLIS GODDARD.

Witnesses:
M. E. COVENEY,
E. A. ALLEN.